United States Patent [19]

Tanaka et al.

[11] Patent Number: 4,930,064
[45] Date of Patent: May 29, 1990

[54] PHASE STABILIZED HIGH FREQUENCY LINK POWER CONVERTER APPARATUS HAVING A WIDE PHASE CONTROLLABLE RANGE

[75] Inventors: Shigeru Tanaka; Kazutoshi Miura, both of Tokyo, Japan

[73] Assignee: Kabushiki Kaisha Toshiba, Kawasaki, Japan

[21] Appl. No.: 256,574

[22] Filed: Oct. 12, 1988

[30] Foreign Application Priority Data

Oct. 12, 1987 [JP] Japan .................................. 62-254571

[51] Int. Cl.$^5$ ................................................ G05F 1/70
[52] U.S. Cl. .................................... 363/161; 318/729; 323/207; 323/212
[58] Field of Search ............... 323/207, 209, 210, 211, 323/212, 217; 363/160, 161, 162; 318/729; 307/105

[56] References Cited

U.S. PATENT DOCUMENTS

| | | | |
|---|---|---|---|
| 4,418,380 | 11/1983 | Tanaka et al. | 363/10 |
| 4,529,925 | 7/1985 | Tanaka et al. | 323/207 |
| 4,570,214 | 2/1986 | Tanaka | 323/160 |
| 4,760,321 | 7/1988 | Tanaka et al. | 318/729 |
| 4,812,669 | 3/1989 | Takeda et al. | 323/207 |

Primary Examiner—William H. Beha, Jr.
Attorney, Agent, or Firm—Oblon, Spivak, McClelland, Maier & Neustadt

[57] ABSTRACT

A high frequency link power converter apparatus includes a power source, a circulating current type AC-AC converter having an output terminal connected to the power source, a high frequency phase-advancing capacitor connected to an input terminal of the AC-AC converter, a phase controller for controlling a firing phase of the AC-AC converter, an external oscillator for supplying phase reference signals to the phase controller, a first circuit for controlling a crest value of voltages applied to the phase-advancing capacitor, a second circuit for detecting a phase difference between the reference signals and the voltages applied to the phase-advancing capacitor, and a third circuit for controlling the phase difference, so that the magnitude of the phase difference becomes substantially zero.

6 Claims, 9 Drawing Sheets

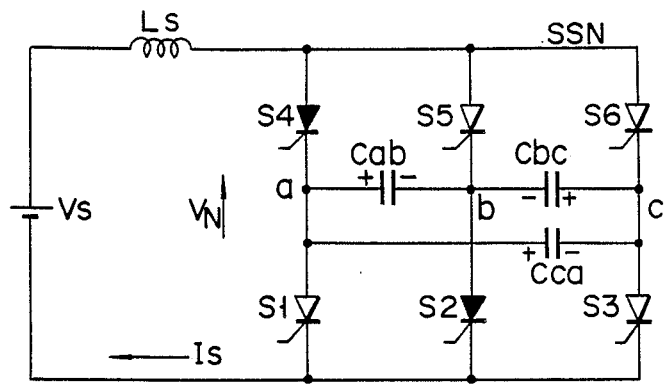
F I G. 2
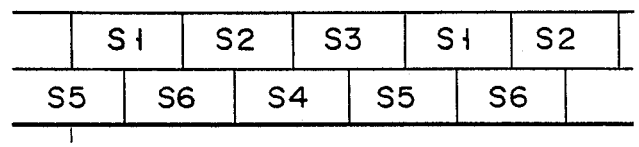
F I G. 3A
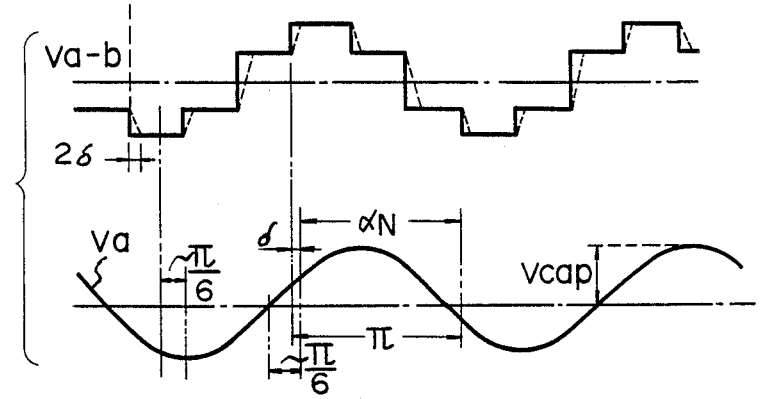
F I G. 3B

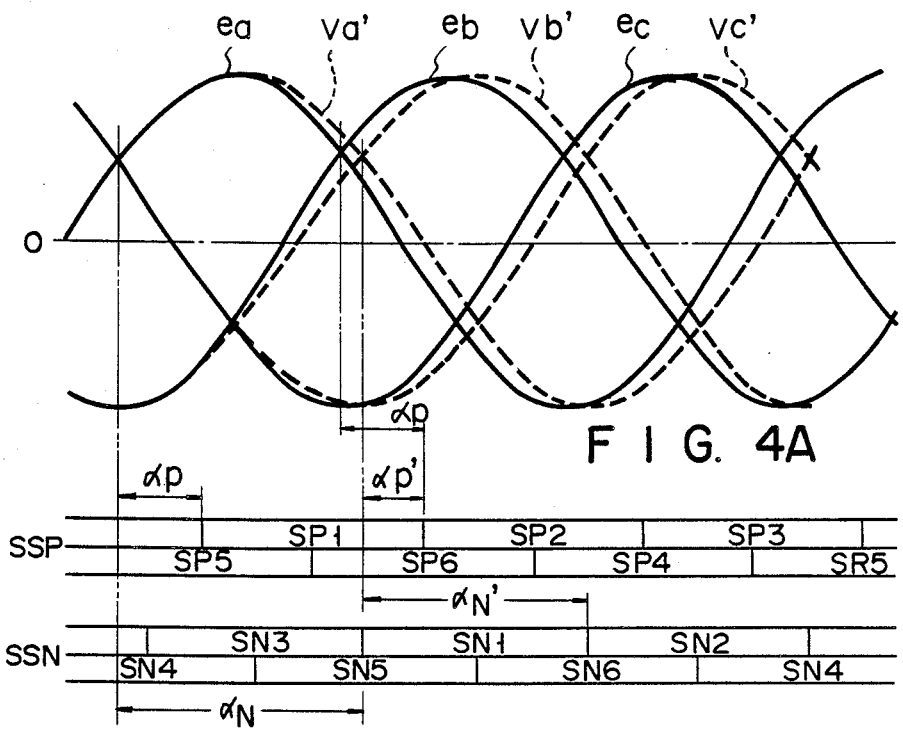
FIG. 4A
FIG. 4B
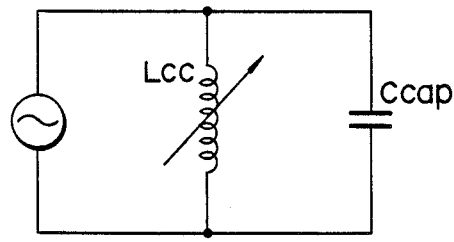
FIG. 5

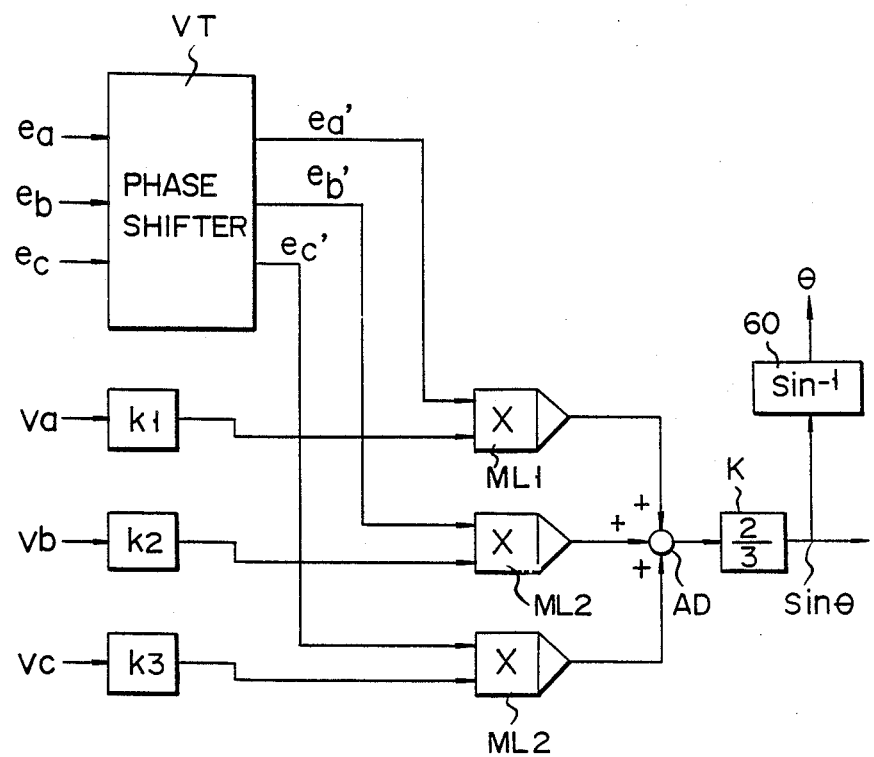
F I G. 6

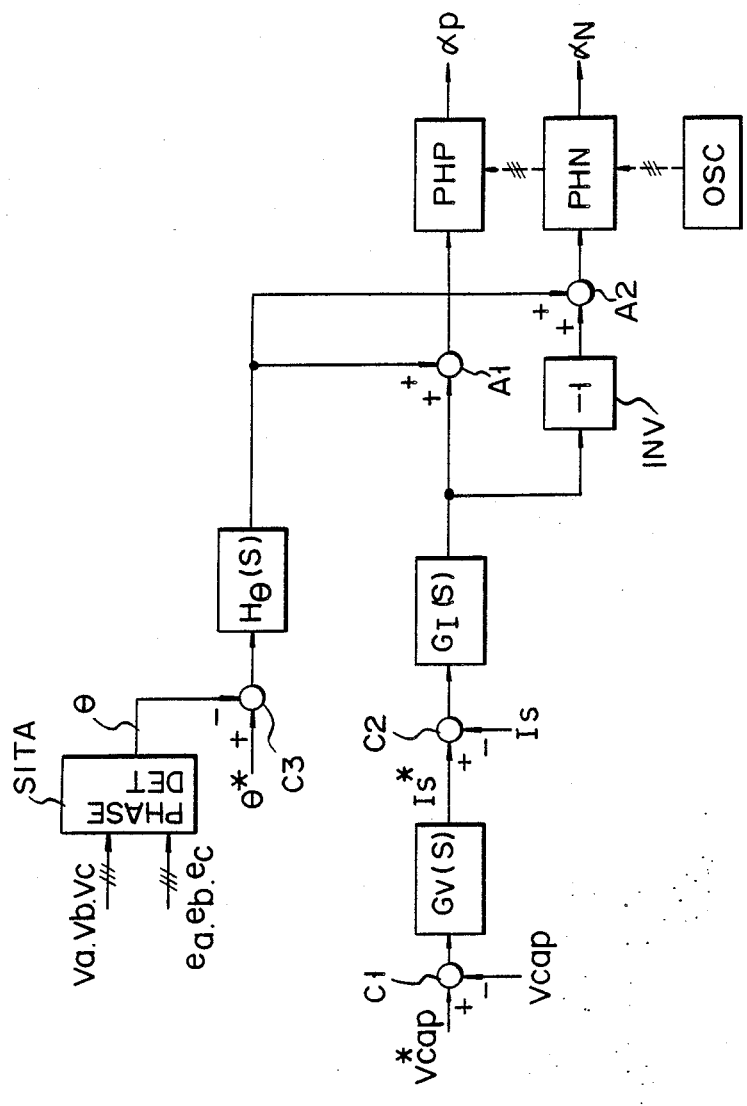
F I G. 7

PHASE STABILIZED HIGH FREQUENCY LINK POWER CONVERTER APPARATUS HAVING A WIDE PHASE CONTROLLABLE RANGE

BACKGROUND OF THE INVENTION

1. Field of the Invention

This invention relates to a high frequency link power converter apparatus for causing natural commutation based on voltage of a phase-advancing capacitor used as a high frequency power source.

2. Description of the Related Art

The applicant of this invention proposed a AC motor driver (Japanese Patent Application No. 61-165028 corresponding to U.S. Pat. No. 4,760,321 issued on July 26, 1988) as one application example of a high frequency link power converter apparatus.

In the AC motor driver, two AC-AC converters naturally commutated by voltages applied to phase-advancing capacitors which serve as high frequency power sources. The first AC-AC converter controls its input current supplied from an AC power source so that the crest value of voltage applied to the phase-advancing capacitor can be kept, at a constant level. The second AC-AC converter performs frequency conversion using the phase-advancing capacitor as the high frequency power source and supplies sinusoidal current of variable voltage and variable frequency to the AC motor.

In the above device, the input current supplied from the AC power source can be controlled to have a sinusoidal waveform which is inphase with the power source voltage, and the operation can be attained with input power factor = 1 and with less higher harmonics of input current. Current supplied to the AC motor can be controlled to have a sinusoidal waveform, making it possible to perform the operation without any torque ripple. In this case, the maximum output frequency can be set at as high as several hundreds Hz. Thus, a veriable-speed AC motor of very high speed and large capacity can be provided.

However, the high frequency link power converter apparatus of the above Japanese Patent Application has the following problems.

In principle, in the apparatus of the above Japanese Patent Application, the circulating current of the first AC-AC converter naturally increases or decreases so as to coincide the frequency and phase of voltage applied to the phase-advancing capacitor with those of a reference signal (high frequency 3-phase power source voltage) supplied to the phase controller of the cycloconverter. However, in practice, a phase difference due to circuit loss or the like occurs between the voltage applied to the phase-advancing capacitor and the reference voltage. As a result, voltage actually applied to the input terminal of each converter becomes inconsistent with phase reference voltage for determining the firing phase of the converter, making it impossible to generate necessary output voltage. Then, the phase input signal is deviated correspondingly, narrowing the controllable range and causing the power source control to be made nonlinear and saturated.

When the load of the high frequency link power converter apparatus is abruptly changed, the phase of voltage applied to the phase-advancing capacitor varies with respect to the reference voltage, but the rate of attenuation of this variation is slow in the apparatus of the above Japanese Pat. Application. At this time, commutation failure of natural commutation will be caused by such variation in the phase of voltage applied to the phase-advancing capacitor, and overcurrent, etc., incurred by the commutation failure, will negatively affect the element.

SUMMARY OF THE INVENTION

It is accordingly an object of this invention to provide a high frequency link power converter apparatus in which a wide phase controllable range can be obtained by making the phase of voltage applied to the phase-advancing capacitor, which serves as a high frequency power source, stable and by suppressing the phase difference between the capacitor voltage and the reference voltage to a minimum, thus enhancing the commutation limit of natural commutation.

The above object can be attained by a high frequency link power converter apparatus comprising a DC or AC power source; a circulating current type AC-AC converter having an output terminal connected to the power source; a high frequency phase-advancing capacitor connected to an input terminal of the AC-AC converter a phase controller for controlling the firing phase of the AC-AC converter; an external oscillator supplying a phase reference signal to the phase controller; means for controlling the crest value of voltage applied to the phase-advancing capacitor; means for detecting a phase difference between the reference signal supplied from the external oscillator and the voltage applied to the phase-advancing capacitor; and means for controlling the detected phase difference.

The circulating current type AC-AC converter causes natural commutation based on the voltage applied to the phase-advancing capacitor. The crest value of voltage applied to the phase-advancing capacitor is controlled to be substantially constant by adjusting current supplied from the DC or AC power source by means of the AC-AC converter. Further, the phase controller for controlling the firing phase of the AC-AC converter is supplied with a phase reference signal from the external oscillator. As a result, the frequency and phase of voltage applied to the phase-advancing capacitor are so changed as to coincide with those of the reference signal. However, in practice, a phase difference due to circuit loss or the like will occur between the voltage applied to the phase-advancing capacitor and the reference voltage. The phase difference is detected and, in accordance with the detected phase difference, the circulating current of the to AC-AC converter is adjusted to reduce the phase difference to zero.

When a load (for example, a second AC-AC converter or the like for driving an AC motor) is connected to the phase-advancing capacitor, and if the load is abruptly changed, the crest value, frequency, and/or phase of the voltage applied to the phase-advancing capacitor tend to fluctuate. At this time, however, the magnitude of the voltage is kept constant by the crest value control means, and the frequency and phase of the voltage are kept stable by the phase difference control means.

As a result, the phase control for each converter becomes stable, no commutation failure occurs and a wide phase control range can be obtained.

BRIEF DESCRIPTION OF THE DRAWINGS

FIG. 2 is an equivalent circuit diagram for illustrating the starting operation of the apparatus shown in FIG. 1;

FIGS. 3A and 3B are timing charts for illustrating the operation of the apparatus shown in FIG. 1;

FIGS. 4A and 4B are other timing charts for illustrating the operation of the apparatus shown in FIG. 1;

FIG. 5 another equivalent circuit diagram for illustrating the operation of the apparatus shown in FIG. 1;

FIG. 6 is a circuit diagram showing an example of a phase difference detector (SITA) used in the apparatus of FIG. 1;

FIG. 7 a circuit diagram showing another embodiment of a control circuit of the power converter apparatus according to this invention;

DETAILED DESCRIPTION OF THE PREFERRED EMBODIMENTS

Figure 1:
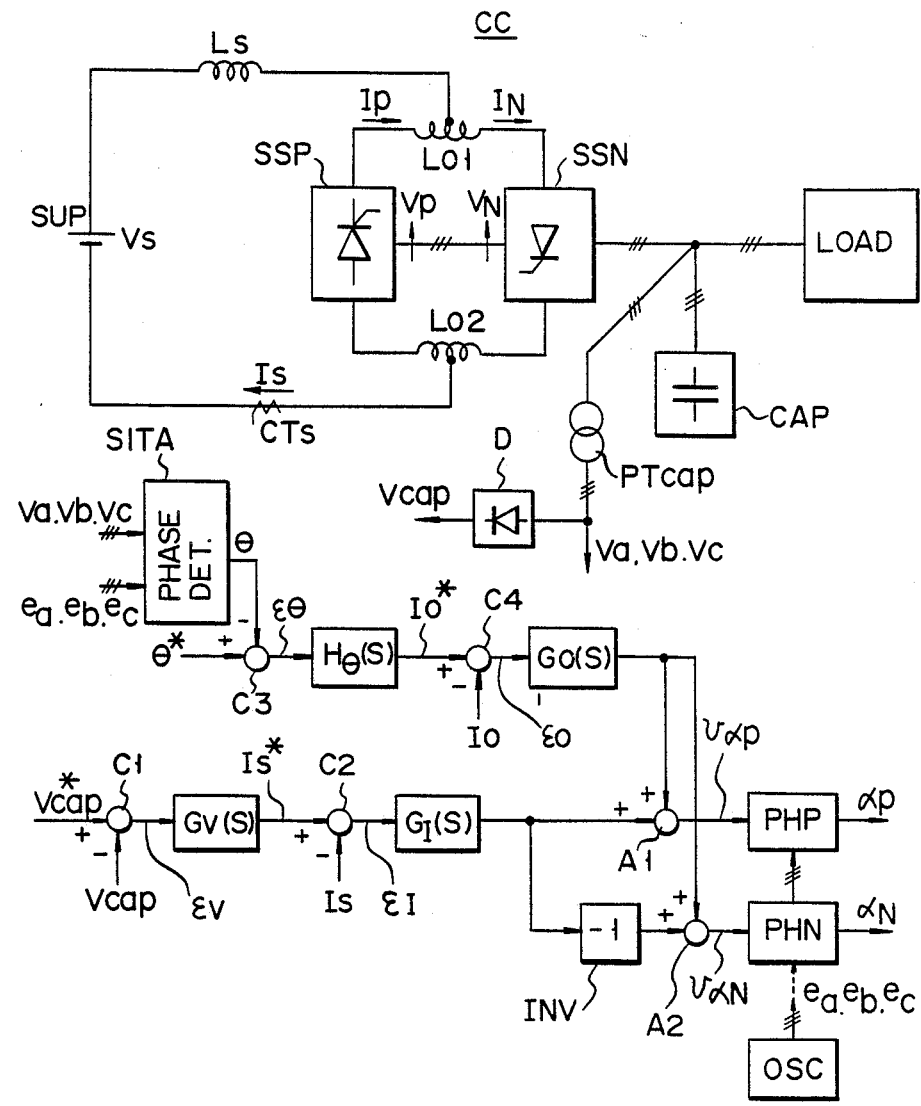
FIG. 1 is a circuit diagram showing the one embodiment of a high frequency link power converter apparatus according to this invention.

FIG. 1 is a circuit diagram showing the construction of one embodiment of a high frequency link power converter apparatus according to this invention.

In FIG. 1, SUP denotes a DC power source, Ls denotes a DC reactor, CC denotes a circulating current type AC-AC converter, CAP denotes a phase-advancing capacitor, and LOAD denotes a load device.

Circulating current type AC-AC converter CC includes positive group converter SSP, negative group converter SSN, and DC reactors Lo1 and Lo2.

Further, current transformer CTs, potential transformer PTcap, rectifier D, phase difference detector SITA, comparators C1 to C4, adders A1 and A2, voltage control compensator GV(S), input current control compensator GI(S), circulating current control compensator Go(S), phase difference control compensator Hθ(S), inverting amplifier INV, phase controllers PHP and PHN, and external oscillator OSC, are provided to constitute a control circuit.

Circulating current type AC-AC converter CC controls current Is supplied from DC power source SUP so that crest value Vcap of voltages Va, Vb, and Vc, applied to phase-advancing capacitor CAP, is kept constant.

Load device LOAD is, for example an AC-AC converter for driving an induction motor. This AC-AC converter functions to supply an AC power of variable voltage and variable frequency to the induction motor, using high frequency phase-advancing capacitor as the 3-phase power source.

Now, each control operation effected in the embodiment of FIG. 1 will be explained.

First, an explanation is given to the operation for establishing a voltage on the phase-advancing capacitor using negative group converter SSN.

FIG. 2 is an equivalent circuit showing the relation between DC power source, negative group converter SSN, phase-advancing capacitors Cab, Cbc, and Cca, and DC reactor Ls.

In the circuit of FIG. 2, when a firing pulse is input to thyristors S2 and S4, charging current Is flows in the path of power source Vs+→reactor Ls thyristor S4→capacitor Cab→thyristor S2→power source Vs−, and in the path of power source Vs+→reactor Ls→thyristor S4→capacitor Cca→capacitor Cbc→thyristor S2→power source Vs−. As a result, power source voltage Vs is charged on capacitor Cab, and voltage of −Vs/2 is applied to capacitors Cbc and Cca.

FIG. 3A shows the firing mode of thyristors S1 to S6 of negative group converter SSN. In this mode, firing pulses are supplied in synchronism with 3-phase reference signals ea, eb, and ec from external oscillator OSC shown in FIG. 1. After establishing the mode shown in FIG. 2, a firing pulse is supplied to thyristor S3. Then, a reverse bias voltge is applied to thyristor S2 by voltage charged on capacitor Cbc, so that thyristor S2 is turned off. That is, in the starting operation, phase-advancing capacitor CAP) functions as a commutation capacitor. When thyristors S4 and S3 are turned on, voltages applied to capacitors Cab, Cbc, and Cca are changed.

FIG. 3B shows waveforms of voltage Va-b between terminals a and b of FIG. 2 and phase voltage Va in the firing mode of FIG. 3A. Since voltage Va-b is charged via reactor Ls, it gradually rises as shown by broken lines in FIG. 3B. Assuming that the rise time is 2δ. Then, a fundamental wave component of Va-b is delayed by δ. Further, phase voltage Va is delayed by (π/6) radian with respect to line voltage Va-b.

As is easily understood by referring to the firing mode and phase voltage Va in FIGS. 3A and 3B, phase control angle αN can be expressed as follows:

$$\alpha N = \pi - \delta \text{(radian)} \tag{1}$$

Since δ is not so large, it can be regarded that the operation is effected with αN≈180°. Assume that the direction indicated by the arrow in FIG. 2 is positive. Then, output voltage VN of converter SSN can be expressed as follows:

$$VN = -kv \cdot Vcap \cdot \cos\alpha N \tag{2}$$

where kv is a proportional constant, and Vcap is a crest value of the phase voltage on capacitor CAP.

Output voltage VN is balanced with power source voltage Vs. However, in this condition, voltage higher than power source voltage Vs is not charged on phase-advancing capacitor CAP. In order to increase capacitor voltage Vcap, firing angle αN is slightly shifted towards 90°. Then, output voltage VN expressed by equation (2) decreases and Vs>VN. As a result, charging current Is increases to increase capacitor voltage Vcap which becomes stable when Vs=VN. In order to further increase capacitor voltage Vcap, αN is further shifted towards 90° to decrease output voltage VN.

When αN=90°, VN=0V, and it becomes theoretically possible to charge capacitor voltage Vcap to a high voltage with low power source voltage Vs. However, in practice, circuit loss cannot be avoided, and it becomes necessary to supply power corresponding in amount to the circuit loss.

In this way, voltage Vcap of phase-advancing capacitor CAP can be charged to a desired voltage level.

It is now explained that voltages Va, Vb, and Vc of phase-advancing capacitor CAP, which are determined in the manner described above, coincide in frequency and phase with 3-phase reference voltages ea, eb, and ec supplied to phase controllers PHP and PHN shown in FIG. 1.

In order to control input current Is supplied from the power source, AC-AC converter CC changes output voltage Vcs according to power source voltage, Vs. Output voltage Vcs of AC-AC converter CC is equal to the average value of output voltage VP of positive group converter SSP and output voltage VN of negative group converter SSN, and is expressed as follows:

$$Vcs = (VP + VN)/2 \qquad (3)$$

Further, circulating current Io is caused to flow when a difference (VP−VN) between output voltages of the positive group and negative group converters is applied to DC reactors Lo1 and Lo2. That is, when VP>VN, Io increases and when VP >VN, Io decreases.

In general, VP≈VN, and circulating current Io will not vary. At this time, the firing phase angle satisfies the following condition;

$$\alpha N \approx 180° - \alpha P \qquad (4)$$

FIGS. 4A and 4B show firing pulse signals of the positive group and negative group converters, and phase control reference signals ea, eb, and ec where $\alpha P = 45°$ and $\alpha N = 135°$.

Reference signals ea, eb, and ec which are supplied from external OSC are expressed as follows:

$$ea = \sin(\omega c \cdot t) \qquad (5)$$
$$eb = \sin(\omega c \cdot t - 2\pi/3) \qquad (6)$$
$$ec = \sin(\omega c \cdot t + 2\pi/3) \qquad (7)$$

where $\omega c = 2\pi fc$ is an angular frequency of high frequency, and fc is selected to be approx. 1 1Hz, for example.

In a case where voltages Va, Vb, and Vc of phase-advancing capacitor CAP respectively coincide in frequency and phase with reference voltages ea, eb, and ec, output voltages of converters SSP and SSN can be expressed as follows:

$$VP = k \cdot Vcap \cdot \cos\alpha P \qquad (8)$$

$$VN = -k \cdot Vcap \cdot \cos\alpha N \qquad (9)$$

Therefore, the relation VP≈VN is established if equation (2) is satisfied, and no variation in circulating current Io occurs.

Suppose that frequency fcap of the capacitor voltage is lowered and voltages Va′, Vb′, and Vc′ are obtained as indicated by broken lines in FIG. 4A.

The firing phase angle of converter SSP changes from αP to αP′, and the firing phase angle of converter SSN changes from αN to αN′. As a result, VP>VN, and circulating current Io of cycloconverter CC increases.

Circulating current Io becomes delayed-reactive power on the input side of AC-AC converter CC when viewed from phase-advancing capacitor CAP.

FIG. 5 shows an equivalent circuit corresponding to one-phase circuit on the input side of AC-AC converter CC, and cycloconverter CC is replaced by variable inductor Lcc providing delay current. Resonance frequency fcap of the circuit is expressed as follows:

$$fcap = 1/(2\pi \sqrt{Lcc \cdot Ccap}) \qquad (10)$$

Increase in the circulating current can be regarded as being equal to decrease in equivalent inductor Lcc. Therefore, frequency fcap of voltages Va′, Vb′, and Vc′ increases and becomes closer to frequency fc of reference voltages ea, eb, and ec.

Likewise, when fcap>fc, circulating current Io decreases and Lcc increases, and a stable condition is attained at fcap=fc.

In a case where the phase of voltage of phase-advancing capacitor CAP is delayed behind the phase of the reference voltage, the circulating current increases as in the case of fcap<fc, thus advancing the voltage phase of phase-advancing capacitor CAP. In contrast, in a case where the phase of voltage of phase-advancing capacitor CAP leads ahead the phase of the reference voltage, the circulating current decreases as in the case of fcap>fc, thus delaying the voltage phase of phase-advancing capacitor CAP. In this way, the magnitude of the circulating current is automatically adjusted so that voltages Va, Vb, and Vc of phase-advancing capacitor CAP can be set equal in frequency and phase to reference voltages ea, eb, and ec.

However, in practice, the phase of voltages Va, Vb, and Vc applied to phase-advancing capacitor CAP will be delayed behind that of reference voltages ea, eb, and ec due to the circuit loss. If the delay angle is $\theta$, capacitor voltages Va, Vb, and Vc are expressed as follows:

$$Va = Vcap \cdot \sin(\omega c \cdot t - \theta) \qquad (11)$$
$$Vb = Vcap \cdot \sin(\omega c \cdot t - \theta + 2\pi/3) \qquad (12)$$
$$Vc = Vcap \cdot \sin(\omega c \cdot t - \theta - 2\pi/3) \qquad (13)$$

where Vcap is a crest value of the voltage on capacitor CAP.

Now, the operation of controlling crest value Vcap of voltages Va, Vb, and Vc applied to phase-advancing capacitor CAP and the operation of controlling phase angle $\theta$ will be explained with reference to FIG. 1.

First, input current Is is controlled as follows:

Input current Is is supplied from current transformer CTs to comparator C2 and compared with instruction value Is*, and deviation $\epsilon I = Is^* - Is$ is input to input circuit control compensator GI(S). For brief explanation, GI(S) serves only to inverting proportional factor −KI. Output signal eGI of GI(S) is sent to phase controller PHP of positive group converter SSP, via adder A1. Further, output signal eGI of GI(S) is sent to phase controller PHN of negative group converter SSN, via inverting amplifier INV and adder A2. At this time, if output signal eGo of circulating current control compensator Go(S) is sufficiently small, input voltages $\gamma\alpha P$ and $\gamma\alpha N$ of phase controllers PHP and PHN can be expressed as follows:

$$\gamma\alpha P \approx -KI \cdot \epsilon I \qquad (14)$$

$$\gamma\alpha N \approx KI \cdot \epsilon I \qquad (15)$$

As a result, output voltages of the positive group and negative group converters are expressed as follows by using proportional factor kc:

$$VP = c \cdot \gamma aP \approx -kc \cdot KI \cdot \epsilon I \quad (16)$$

$$VP = -kc \cdot \gamma aN \approx VP \quad (17)$$

When Is*>Is, deviation ϵI becomes positive, decreasing VP and VN. As a result, voltage Vs−(VP+VN)/2 applied to reactor Ls becomes positive, increasing input current Is.

In contrast, when Is*>Is, deviation ϵI becomes negative, increasing VP and VN and decreasing input current Is. The operation becomes stable when Is=Is*.

Next, the operation of controlling crest value Vcap of voltage applied to phase-advancing capacitor is explained.

Instantaneous values of voltages Va, Vb, and Vc applied to phase-advancing capacitor CAP are detected by 3-phase potential transformed PTcap. The detected values are rectified by rectifier D to determine crest value Vcap.

Detected crest value Vcap is input to comparator C1 and compared with crest value instruction Vcap*. Deviation ϵv=Vcap*−Vcap is input to succeeding voltage control compensator GV(S) and subjected to proportional amplification or integration. An output of GV(S) is used as instruction value Is*. for controlling input current Is.

When Vcap*>Vcap, deviation ϵv becomes positive, and is supplied, via Gv(S), to increase the value of current instruction value Is*. As described before, input current Is is controlled to coincide with instruction value Is*. Therefore, Is increases and effective power Ps=Vs·Is is supplied from power source SUP to phase-advancing capacitor CAP. Thus, accumulation energy $(\frac{1}{2})Ccap \cdot (Vcap)^2 = Ps \cdot t$ in the capacitor increases. Voltage crest value Vcap thus increases.

In contrast, when Vcap*<Vcap, deviation ϵv becomes negative, and is supplied, via GV(S), to reduce current instruction value Is*. When deviation ϵv becomes a large negative value, Is* may become negative. As a result, effective power Ps becomes negative and accumulation energy in the capacitor is regenerated to power source SUP, thus decreasing Vcap. The control operation is effected to finally attain Vcap=Vcap*.

As described above, voltage crest value Vcap of phase-advancing capacitor CAP is controlled to coincide with instruction value Vcap*.

Next, the operation of controlling the circulating current in the AC-AC converter is explained.

Circulating current Io of AC-AC converter CC can be obtained as follows using output currents IP and IN of the positive group and negative group converters:

$$Io = (IP = IN - |IP - IN|/2 \quad (18)$$

Circulating current Io thus obtained is input to comparator C4 and is compared with instruction value Io*. Deviation ϵo=Io*−Io is input to compensator Go(S) and subjected to proportional amplification. When the proportional factor of Go(s) is Ko, phase control input voltages γaP and γaN can be rewritten as follows:

$$\gamma aP = -KI \cdot \epsilon I + Ko \cdot \epsilon o \quad (19)$$

$$\gamma aN = KI \cdot \epsilon I = Ko \cdot \epsilon O \quad (20)$$

When Io*>Io, deviation eo becomes positive, so that output voltage VP of positive group converter SSP increases and output voltage VN of negative group converter SSN decreases. As a result, VP>VN is established, so that circulating current Io increases.

In contrast, when Io*>Io, deviation eo becomes negative, and consequently VP<VN, resulting in reducing circulating current Io. The operation becomes stable when Io≈Io*.

Next, an explanation will be given to a method of controlling phase difference θ of voltages Va, Vb, and Vc applied to phase-advancing capacitor CAP, using circulating current Io.

FIG. 6 is a circuit diagram showing the construction of phase difference detector SITA of FIG. 1. In FIG. 6, k1 to k3 are proportional factors, ML1 to ML3 denote multipliers, AD denotes an adder, K is a proportional factor, and VT denotes a phase shifter.

First, output signals ea, eb, and ec of external oscillator OSC are converted to signals ea′, eb′, and ec′ having phase lead of 90° by means of phase shifter VT. Thus, the following relations are obtained:

$$ea' = (ec - eb)/\sqrt{3} = \sin(\omega c \cdot t + \pi/2) = \cos(\omega c \cdot t) \quad (21)$$

$$eb' = (ea - ec)/\sqrt{3} = \cos(\omega c \cdot t - \pi/3) \quad (22)$$

$$ec' = (eb - ea)/\sqrt{3} = \cos(\omega c \cdot t + \pi/2) \quad (23)$$

Instantaneous values Va, Vb, and Vc of phase-advancing capacitor CAP, detected by 3-phase potential transformer PTcap, are normalized by use of proportional factors k1 to k3, and converted into unit voltages γa, γb, and γc.

Multipliers ML1 to ML3, adder AD, and the proportional factors are used to derive sinusoidal value sin θ with phase difference θ as shown in the following equation:

$$\frac{2}{3}(ea' \cdot va + eb' \cdot vb + ec' \cdot vc) =$$

$$\frac{2}{3}\left\{ \cos(\omega c \cdot t) \cdot \sin(\omega c \cdot t - \theta) - \right.$$

$$\cos\left(\omega c \cdot t - \frac{2\pi}{3}\right) \cdot \sin\left(\omega c \cdot t - \frac{2\pi}{3} - \theta\right) -$$

$$\left. \cos\left(\omega c \cdot t - \frac{2\pi}{3}\right) \cdot \sin\left(\omega c \cdot t + \frac{2\pi}{3} - \theta\right) \right\} = -\sin \theta$$

When phase difference θ is not so large, θ≈sin θ, and therefore no serious problem occurs even if sin θ is used as a control amount. Precise value of θ can be obtained by performing the operation of $\sin^{-1}$ with respect to the derived result, via function converter 60.

Phase difference θ is expressed to be positive when it is leading.

Detected phase difference θ is input to comparator C3 of FIG. 1 and compared with instruction value θ*. Instruction value θ* is normally set to be zero. Deviation ϵθ=θ*−θ from comparator C3 is input to phase difference controller Hθ(S) and subjected to proportional amplification or integration. An output signal of Hθ(S) is used as the circulating current instruction value Io*.

When θ*>θ, deviation ϵθ becomes positive, increasing circulating current instruction value Io*, via Hθ(S).

Therefore, instruction value Io also increases, resulting in decreasing Lcc in the equivalent circuit of FIG. 5. Thus, frequency fcap in equation (10) becomes high, to thereby advance phase $\theta$ of voltages Va, Vb, and Vc of phase-advancing capacitor CAP.

When $\theta^* < \theta$, deviation $\epsilon\theta$ becomes negative, thus decreasing circulating current instruction value Io and lowering frequency fcap in equation (10). As a result, phase $\theta$ of voltages Va, Vb, and Vc is delayed.

The operation becomes finally stable at $\theta = \theta^*$. If instruction value $\theta^*$ is zero, then phase difference $\theta$ becomes zero. Therefore, application voltages Va, Vb, and Vc of phase-advancing capacitor CAP completely coincide in phase with reference signals from external oscillator OSC.

In this way, no disadvantageous phenomena such as nonlinearity and saturation occur in the phase control operation, and a wide range of controllable area can be obtained.

Further, even when the load is rapidly changed and phase difference $\theta$ occurs, the phase control loop effectively functions to rapidly attenuate phase difference $\theta$ and restore the original condition. Thus, the possibility of commutation failure can be eliminated.

Figure 6A:
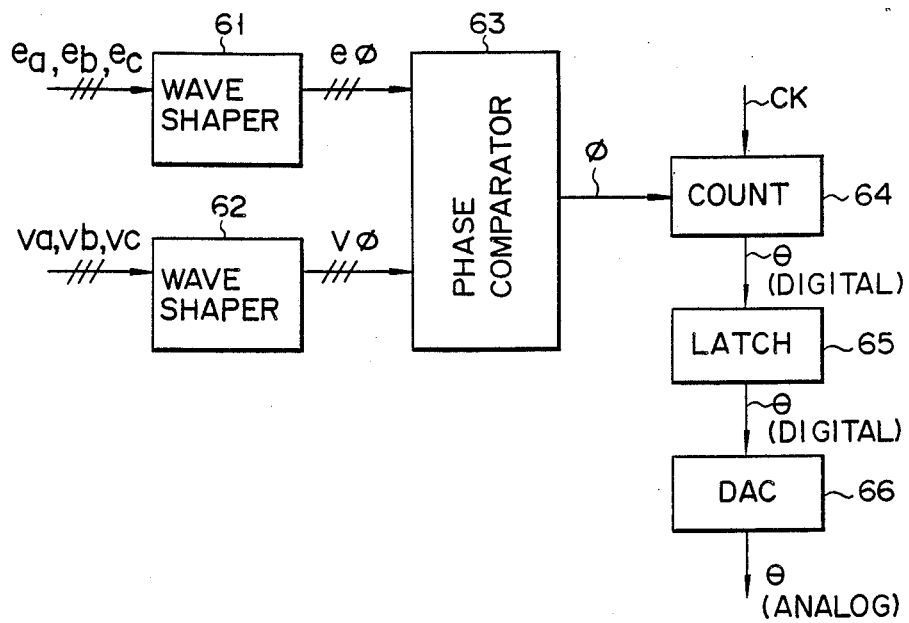
FIG. 6A shows another example of the phase difference detector (SITA)
Figure 6B:
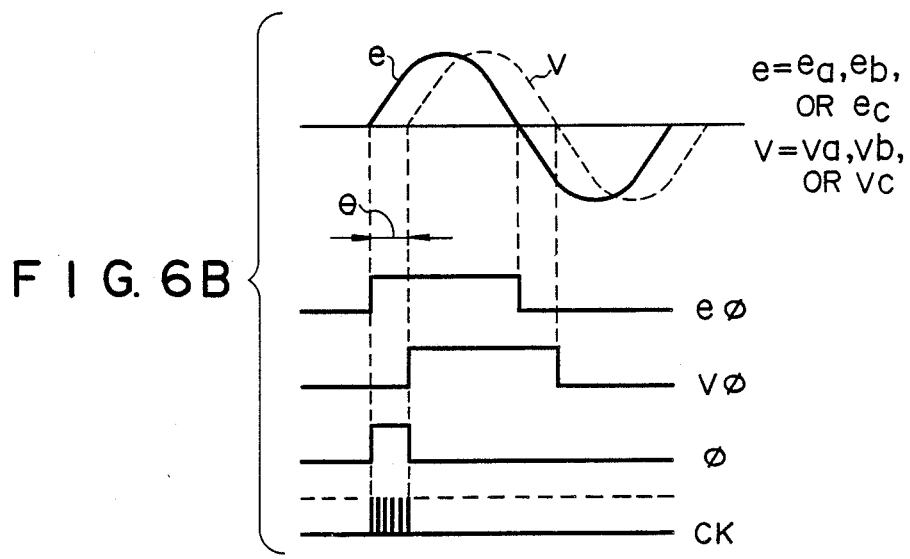
FIG. 6B is a timing chart illustrating the operation of the detector of FIG. 6A.

FIG. 6A shows another example of phase difference detector SITA in FIG. 1. FIG. 6B illustrates waveforms of signals in the circuit of FIG. 6A. In the illustration of FIG. 6B, except for the phase difference of 120°, signals ea, eb, and ec are the same and represented by signal e. Similarly, voltages Va, Vb, and Vc are represented by voltage V.

As shown in FIG. 6A, 3-phase reference signals ea, eb, and ec are input to wave shaper 61. Wave shaper 61 senses the zero-cross point of each of signals ea, eb, and ec, and generates 3-phase rectangular signals e$\phi$. 3-phase capacitor voltages Va, Vb, and Vc are input to wave shaper 62. Wave shaper 62 senses the zero-cross point of each of voltages Va, Vb, and Vc, and generates 3-phase rectangular signals V$\phi$. Signals e$\phi$ and V$\phi$ are input to phase comparator 63. Comparator 63 compares the signal phases of Va, Vb, and Vc (=V$\phi$) with those of ea, eb, and ec (=e$\phi$), respectively. Comparator 63 generates gate signal $\phi$ representing the phase difference ($\theta$) between v$\phi$ and e$\phi$.

Signal $\phi$ is supplies as a gate signal to counter 64. Counter 64 counts clock pulse CK for each period of gate signal $\phi$. Then, numeric or digital output $\theta$ of counter 64 represents the phase difference ($\theta$) between v$\phi$ and e$\phi$. Digital output $\theta$ from counter 64 is temporarily stored in latch 65 for each cyclic period of signal $\phi$. The data ($\theta$) latched in latch 65 is converted into analog signal $\theta$, via D/A converter 66. Analog signal $\theta$ thus obtained is supplied to controller H$\theta$(s) in FIGS. 1 or 10, or to automatic phase regulator A$\theta$R in FIGS. 8 or 9. (Regulator A$\theta$R corresponds to circuit elements C3, H$\theta$(S) in FIG. 1).

FIG. 7 is a circuit diagram showing the construction of another embodiment of a controller according to this invention.

In this embodiment, an output signal of compensator H$\theta$(S) is not used as an instruction value of the circulating current, but is supplied to phase controllers PHP and PHN, via adders A1 and A2.

The circulating current of AC-AC converter CC can be adjusted in substantially the same manner as described with reference to FIG. 1, and phase difference $\theta$ is controlled to coincide with instruction value $\theta^*$.

Figure 8:
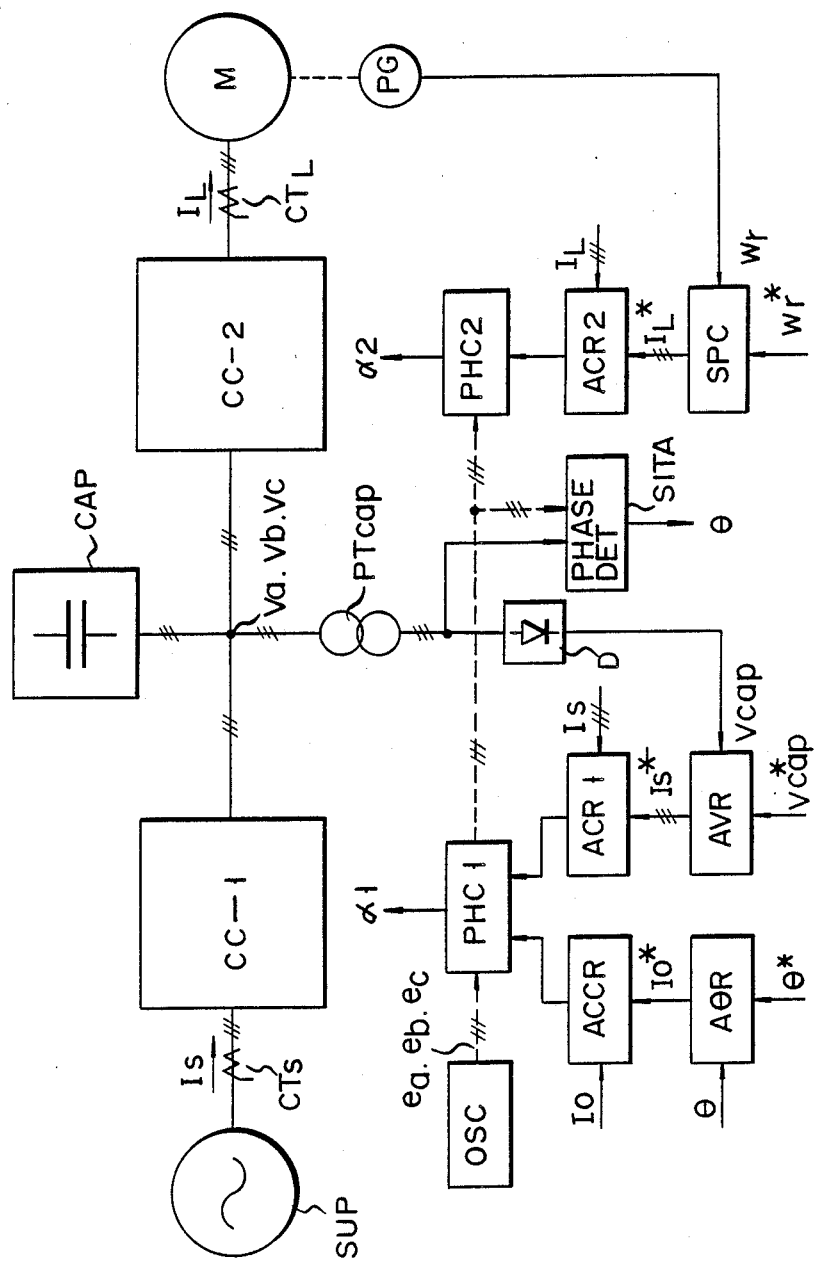
FIG. 8 is a circuit diagram showing another embodiment of the power converter apparatus according to this invention.

FIG. 8 is a circuit diagram showing the construction of another embodiment according to this invention.

In FIG. 8, SUP denotes a 3-phase AC power source; CC-1, a first circulating current type AC-AC converter CAP, a high frequency phase-advancing capacitor; CC-2, a second AC-AC converter M, a 3-phase AC motor; PG, a rotation speed detector; CTs and CTL, current transformers, PTcap, a voltage transformer; D, a rectifier; SITA, a phase difference detector; AVR, a voltage controller; ACR1, an input current controller; A$\theta$R, a phase difference controller; ACCR, a circulating current controller; OSC, an external oscillator; PHC1 a phase controller of the first AC-AC converter; SPC, a speed controller; ACR2, a motor current controller; and PHC2, a phase controller of the second cycloconverter.

The embodiment of FIG. 8 is similar to that of FIG. 1 except that power source SUP is the AC power source. An output of controller AVR is used as instruction values ISR*, ISS*, and IST* of 3-phase input currents ISR, ISS, and IST.

Second AC-AC converter CC 2 and AC motor M are connected as a load device. CC-2 supplies sinusoidal currents ILU, ILV, ILW of variable voltage and variable frequency to motor M using the phase-advancing capacitor as a high frequency power source.

Figure 9:
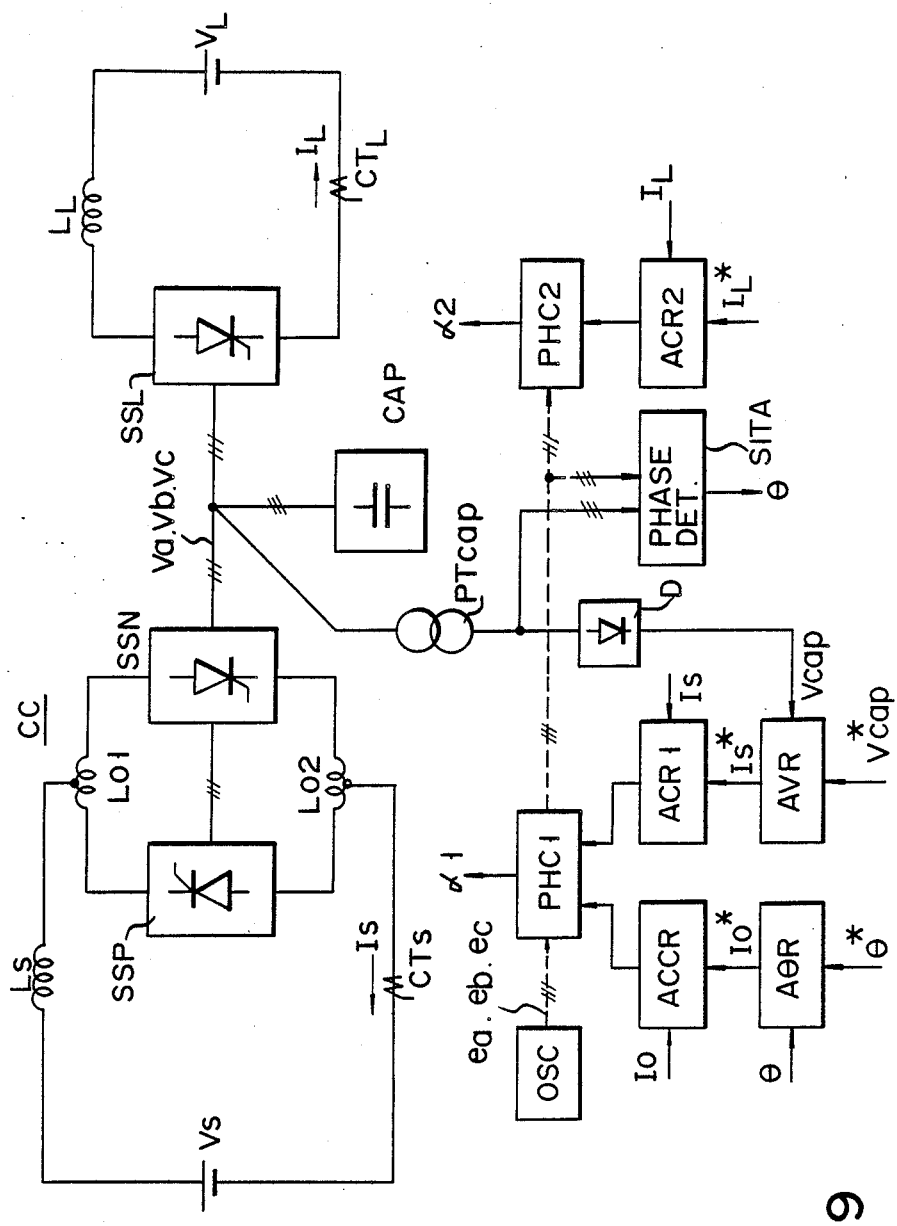
FIG. 9 is a circuit diagram showing still another embodiment of the power converter apparatus according to this invention.

FIG. 9 is a circuit diagram showing the construction of still another embodiment according to this invention.

In FIG. 9, Vs denotes a first DC power source; Ls, a DC reactor; CC, a circulating current type AC-AC converter CAP, a high frequency phase-advancing capacitor; SSL, a separately excited converter; LL, a DC reactor; and VL a second DC power source.

AC-AC convertesr CC includes positive group converter SSP, negative group converter SSN, and DC reactors Lo1 and Lo2.

Current transformers CTS and CTL, voltage transformer PTcap, rectifier D, phase difference detector SITA, voltage controller AVR, first DC current controller ACR1, phase difference controller A$\theta$R, circulating current controller ACCR, second DC current controller ACR2, external oscillator OSC, and phase controllers PHC1 and PHC2 are provided as a control circuit.

It is considered to use a solar battery as second DC voltage source VL. Separately excited converter SSL causes natural commutation using phase-advancing capacitor as high frequency power source, and supplies power generated by solar battery VL to the high frequency phase-advancing capacitor.

When accumulation energy in phase-advancing capacitor CAP increases, circulating current type AC-AC converter CC transfers the accumulation energy to the first DC power source (for example, DC transmission line) to control the crest value of voltages Va, Vb, and Vc applied to phase-advancing capacitor so as to keep the same at a constant value.

The phase difference control is effected in the same manner as described with reference to FIG. 1.

In the above embodiments, a case wherein load device LOAD is connected has been explained. However, it is also possible to apply this invention to a power adjuster such as an active filter as an application example of the high frequency link power converter apparatus.

Figure 10:
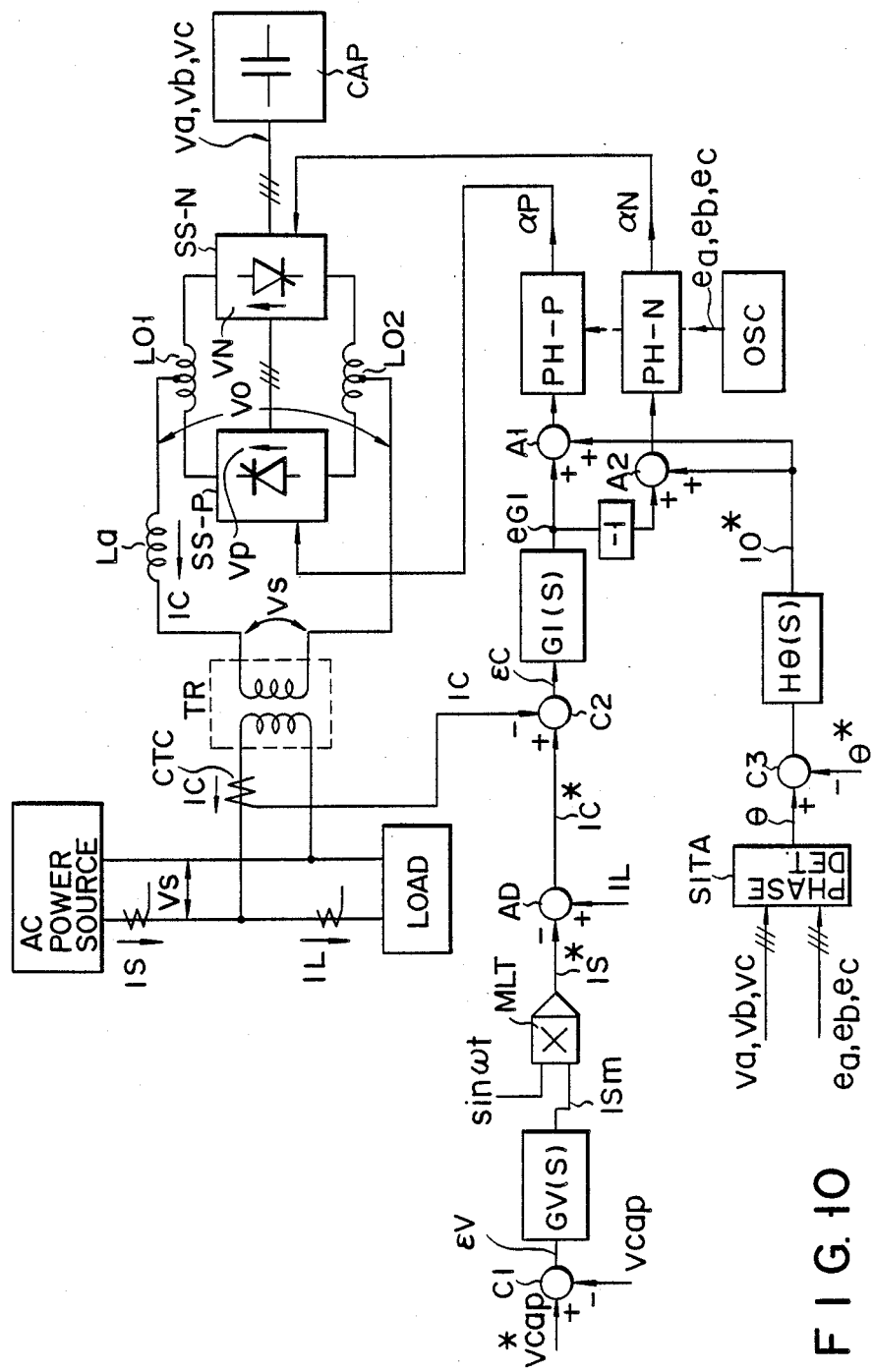
FIG. 10 is a circuit diagram showing yet another embodiment of the power converter apparatus according to this invention.

FIG. 10 illustrates how to apply the present invention to the above active filter. The circuit of FIG. 10 corresponds to FIG. 1 of U.S. Pat. No. 4,529,925 (Tanaka et al). Output εV is converted into signal Ism, via circuit GV(s). Signal Ism is multiplied in multiplier MLT by unit sine wave signal sin wt which is synchronized with AC power source voltage VS. Output Is* from multiplier MLT is supplied to adder AD. Adder AD receives signal IL representing a load current, and provides current instruction Ic* (=IL−Is*). Instruction Ic* is supplied to comparator C2. Comparator C2 compares current Ic of the AC-AC converter with instruction Ic*, and supplied the result (εc) of the comparison to circuit GI(s). The circuit configuration other than the above is similar to FIG. 1 of this invention.

As described above, according to this invention, it is possible to completely coincide the phase of voltages Va, Vb, and Vc applied to the phase-advancing capacitor with that of reference signals ea, eb, and ec supplied from the external oscillator. Further, in the phase control of the AC-AC converter, no disadvantageous phenomena such as non-linearity and saturation occur, and therefore a wide range of controllable area can be attained. Since phase difference θ between voltages Va, Vb, and Vc of the phase-advancing capacitor and reference signals ea, eb, and ec is detected and controlled, variation in phase difference θ can be suppressed to be small and the oscillation can be rapidly attenuated even when the load is rapidly changed. Therefore, the commutation margin angle of the cycloconverter can be prevented from becoming extremely small, this eliminating the possibility of the element being damaged by commutation failure. Thus, a highly reliable high frequency link power converter apparatus can be attained.

What is claimed is:
1. A power converter apparatus comprising:
power source means for supplying electric power;
a capacitor, serving as a high frequency power source, to which a high frequency voltage is applied;
a circulating current type AC-AC converter having a terminal coupled to said capacitor and another terminal coupled to said power source means;
reference signal means for generating a phase reference signal; and
operation control means, coupled to said AC-AC converter and said reference signal means, and being responsive to a prescribed phase reference value and a phase difference between said high frequency voltage and said phase reference signal, for converging the phase difference to the prescribed phase reference value, and controlling operation of said AC-AC converter in accordance with the prescribed phase reference value;
wherein said operation control means includes:
voltage detector means, coupled to said capacitor, for detecting said high frequency voltage;
phase comparator means, coupled to said voltage detector mans and said reference signal means, for comparing a phase of said high frequency voltage with that of said phase reference signal, and generating a phase difference signal representing the phase difference between said high frequency voltage and said phase reference signal;
error detector means, coupled eo said phase comparator means and being responsive to said prescribed phase reference value, for detecting a phase error signal representing a difference between said prescribed phase reference value and said phase difference signal; and
means coupled to said error detector means, said AC-AC converter, and said reference signal means, for controlling a circulating current flowing through said AC-AC converter in accordance with said phase error signal, so that the phase difference between said high frequency voltage and said phase reference signal is converged to said prescribe phase reference value.

2. A power converter apparatus, comprising:
power source means for supplying electric power;
a capacitor, serving as a high frequency power source, to which a high frequency voltage is applied;
a circulating current type AC-AC converter having a terminal coupled to said capacitor and another terminal coupled to said power source means;
reference signal means for generating a phase reference signal; and
operation control means, coupled to said AC-AC converter and said reference signal means, and being responsive to a prescribed phase reference value and a phase difference between said high frequency voltage and said phase reference signal, for converging the phase difference to the prescribed phase reference value, and controlling operation of said AC-AC converter in accordance with the prescribed phase reference value;
wherein said operation control means includes:
voltage detector means, coupled to said capacitor, for detecting said high frequency voltage;
phase comparator means, coupled to said voltage detector means and said reference signal means, for comparing phase of said high frequency voltage with that of said phase reference signal, and generating a phase difference signal representing the phase difference between said high frequency voltage and said phase reference signal;
error detector means, coupled to said phase comparator means and being responsive to said prescriber phase reference value, for detecting a phase error signal representing a difference between said prescribed phase reference value and said phase difference signal; and
means, coupled to said error detector means, said AC-AC converter, and said reference signal means, for controlling the operation of said AC-AC converter in accordance with said phase error signal, so that the phase difference between said high frequency voltage and said phase reference signal is converged to said prescribed phase reference value.

3. An apparatus according to claims 1 or 2, wherein said prescribed phase reference value is selected to be substantially zero.

4. An apparatus according to claims 1 or 2, wherein said phase comparator means includes:
phase shifter means, coupled to said reference signal means, for shifting a phase of said phase reference signal by substantially 90 degrees, and providing a phase-shifted signal; and
multiplier means, coupled to said phase shifter means, for multiplying said phase-shifted signal by a signal corresponding to said high frequency voltage, and obtaining said phase difference signal from a result of this multiplying.

5. An apparatus according to claims 1 or 2, wherein said phase comparator means includes:

first circuit means, coupled to said reference signal means, for detecting a zero-cross point of said phase reference signal, and generating a first phase signal representing a phase of said phase reference signal;

second circuit means, coupled to said capacitor, for deteccting a zero-cross point of said high frequency voltage, and generating a second phase signal representing a phase said high frequency voltage;

third circuit means, coupled to said first and second circuit means, for detecting a phase difference between said first and second phase signals, and generating a phase difference signal having a signal duration representing said phase difference signal; and means, coupled to said third circuit means, for measuring the signal duration of said phase difference signal, and obtaining said phase difference signal from a result of this measuring.

6. A high frequency link power converter apparatus comprising:

a power source;

a circulating current type AC-AC converter having an output terminal connected to said power source;

a high frequency phase-advancing capacitor connected to an input terminal of said AC-AC converter;

a phase controller for controlling a firing phase of said AC-AC converter;

an external oscillator for supplying phase reference signals to said phase controller;

crest value control means, coupled to said high frequency phase-advancing capacitor, for controlling a crest value of voltages applied to said phase-advancing capacitor;

phase difference detection means, coupled to said crest value control means, for detecting a phase difference between the reference signals and the voltages applied to said phase-advancing capacitor; and phase difference control means, coupled to said phase difference detection means, for controlling the phase difference, so that the magnitude of the phase difference becomes substantially zero.

* * * * *